US012582923B2

(12) United States Patent
Balamurugan et al.

(10) Patent No.: US 12,582,923 B2
(45) Date of Patent: Mar. 24, 2026

(54) ANNULAR CENTRIFUGAL EXTRACTOR WITH SOLID SEPARATION PART TO SEPARATE SOLID PARTICLES PRESENT IN SOLVENT EXTRACTION FLUID AND A PROCESS FOR THE SAME

(71) Applicant: Secretary, Department of Atomic Energy, Mumbai (IN)

(72) Inventors: M. Balamurugan, Kalpakkam (IN); N. K. Pandey, Ranchi (IN); Shekhar Kumar, Kalpakkam (IN); J. B. Joshi, Mumbai (IN)

(73) Assignee: Secretary, Department of Atomic Energy, Mumbai (IN)

( * ) Notice: Subject to any disclaimer, the term of this patent is extended or adjusted under 35 U.S.C. 154(b) by 591 days.

(21) Appl. No.: 18/014,392

(22) PCT Filed: Dec. 20, 2021

(86) PCT No.: PCT/IN2021/051190
§ 371 (c)(1),
(2) Date: Jan. 4, 2023

(87) PCT Pub. No.: WO2023/119303
PCT Pub. Date: Jun. 29, 2023

(65) Prior Publication Data
US 2024/0238697 A1      Jul. 18, 2024

(51) Int. Cl.
B01D 11/04          (2006.01)
B04B 11/02          (2006.01)
(52) U.S. Cl.
CPC ........ B01D 11/0457 (2013.01); B01D 11/048 (2013.01)
(58) Field of Classification Search
CPC .............. B01D 11/048; B01D 11/0434; B01D 11/0461; B01D 11/0457;
(Continued)

(56) References Cited

U.S. PATENT DOCUMENTS 2,819,014 A      1/1958   Zabriskie, Jr.
5,762,800 A      6/1998   Meikrantz et al.
(Continued)

FOREIGN PATENT DOCUMENTS

JP          H2229559 A        9/1990

OTHER PUBLICATIONS

Tamhane et al., "Performance of annular centrifugal extractors: CFD simulation of flow pattern, axial mixing and extraction with chemical reaction", Chemical Engineering Science, 2014, pp. 134-143, vol. 110.

*Primary Examiner* — Pranav N Patel
(74) *Attorney, Agent, or Firm* — The Webb Law Firm

(57)          ABSTRACT

This disclosure relates to an annular centrifugal extractor with Solid Separation Part to Separate Solid Particles Present in Solvent Extraction Fluid. In order to remove solid particles from the solution, a solid separation part/rotating bowl is attached to rotating bowl in such a way that solid particles settle inside the solid separation part. This solid separating centrifugal extractor contains two parts: (I) upper part which acts as a liquid-liquid separator to separate aqueous and organic solution used in solvent extraction operation and (II) bottom part which acts as a solid separator to separate solid particle present in solvent extraction liquids. The bottom rotating rotor is coupled with upper rotating rotor by threading arrangement. Both the rotating rotors are confined within a stationary cylinder. Dispersion with solid particles entering inside the rotating bowl is deflected towards the wall of the rotating cylinder by deflecting baffle by centrifugal sedimentation.

5 Claims, 14 Drawing Sheets

(58) Field of Classification Search
CPC ..... B01D 2311/2676; B04B 1/02; B04B 1/00;
B04B 11/02; B04B 11/06; C02F 1/385
See application file for complete search history.

(56) References Cited

U.S. PATENT DOCUMENTS

| 5,908,376 | A | 6/1999 | Macaluso et al. | |
| 2005/0003944 | A1* | 1/2005 | Rivalier | B04B 11/06 |
| | | | | 494/22 |
| 2022/0040596 | A1* | 2/2022 | Restivo | B04B 1/02 |

* cited by examiner

Motor (17)

Seating block (16)

Rotating bowl

Stationary bowl (3)

Motor (17)

Seating block (16)

Stationary bowl (3)

Motor (17)

Seating block
(16)

Rotating bowl
(4A & 4B)

Stationary bowl (3)

Heavy phase weir (11)

Light phase weir (9)

Rotating cylinder

Vertical Baffles

Deflection Baffle

Inlet orifice

ASSEMBLED VERTICAL BAFFLES

ANNULAR CENTRIFUGAL EXTRACTOR WITH SOLID SEPARATION PART TO SEPARATE SOLID PARTICLES PRESENT IN SOLVENT EXTRACTION FLUID AND A PROCESS FOR THE SAME

CROSS-REFERENCE TO RELATED APPLICATION

This application is the United States national phase of International Application No. PCT/IN2021/051190 filed Dec. 20, 2021, the disclosure of which is hereby incorporated by reference in its entirety.

BACKGROUND OF THE INVENTION

Field of Invention

The present invention relates to an Annular Centrifugal Extractor with Solid Separation Part to Separate Solid Particles Present in Solvent Extraction Fluid and a process for the same in a spent nuclear fuel reprocessing industry or in any other solvent extraction (solid particles are encountered) process.

Description of Related Art

The complexities of high radiation damage to solvent and its leads to solvent degradation and necessitate the need for fast contactors (short residence time) like annular centrifugal extractors (ACE) and is currently being used in fast breeder reprocessing (FBR) spent nuclear fuel reprocessing.

Solutions generated from dissolution of nuclear fuel contain unknown quantities of undissolved solids. A majority of these solids are removed via various methods of filtration/separation. Smaller particles are expected to carry through to downstream solvent extraction processes and equipment. Solids/precipitates resulting from mechanical or chemical upsets are another potential area of concern. Solids accumulate uniformly along the inside diameter of the rotor cylinder from the inlet orifice to the heavy phase weir. Over time, these solids form a layer on the inner wall that is sufficiently thick to interfere with the flow of the heavy phase through the heavy-phase underflow slots at the top of the separating zone.

To solve above mentioned problem a clean-in-place (CIP) rotor is as part of the ACE unit has been reported in the literature so far. A series of high pressure spray nozzles are mounted on a hollow shaft that connected to the bottom plate to the upper rotor assembly. These nozzles are employed to remove the solid particles settle inside the ACE during solvent extraction.

The drawbacks associated with the prior art stated above are as follows:

a. High pressure system is not advisable inside the radio-active shielded cell where negative pressure is maintained to contain the radioactivity with in cell volume. In case of solution leakage, accumulated aqueous solution can be unsafe for nuclear criticality.

b. Insertion of spray nozzles add complexity in the manufacturing of ACE which requires high precession manufacturing technique for dynamic balancing of small rotating bowl. The technique increases the manufacturing cost.

c. Liquid may flow through the solid collection pipe which is attached with stationary bowl during normal operation. Hence, to avoid the liquid flow, ACE requires another system integrated to it. The additional system to contain mixed phase inside the stationary bowl (mixing zone) for each stage in ACE cascade.

d. The micron sized solid particles collected inside the stationary bowl may settle inside the downstream of solid handling pipe line. It requires additional dechocking system or process to handle the situation.

e. To process or handle the separated radioactive solid particle is a major concern.

Spent nuclear fuel dissolution solution contains un-dissolved solid particles. The smaller particles are expected to carry over with the solution and partake in the solvent extraction operation. Therefore, high speed centrifuge is employed in fast breeder reprocessing plant to separate un-dissolved fine particles from the solution. The failure or malfunction of the aforementioned centrifuge leads to carry over of particles in the process liquid. In addition, new solid/precipitates may be generated through mechanical or chemical process upsets. The solid particles settle inside the rotating bowl due to high centrifugal force during solvent extraction which forms a cake-like structure on inner wall of the ACE. As a result it leads to a reduction in phase separation capacity or complete chock inside liquid-liquid separator (rotating bowl).

PRIOR ART

1. U.S. Pat. No. 5,908,376_Self cleaning rotor for a centrifugal separator
   Date: 01.06.1999
   Inventors: Lawrence L. Macaluso, David H. Meikarntz
   A self-cleaning rotor assembly for a centrifugal Separator can be thoroughly cleaned of accumulated solids without disassembly of the separator. The rotor assembly comprises a fully welded, enclosed rotor body. The rotor assembly has a double-ended, hollow axial shaft. The bottom end of the axial shaft extends through the separator housing and has a high pressure fluid coupling. A plurality of spray nozzles are fitted to the axial shaft within the rotor body. The spray nozzles are arranged to spray a washing fluid radially onto the interior surfaces of the rotor. The interior volume of the rotor is divided into a plurality of chambers by a corresponding plurality of axial vanes. At least one nozzle is disposed within each of the chambers.

SUMMARY OF THE INVENTION

Therefore an object of the invention to propose an annular centrifugal extractor with solid separation part to separate solid particles present in solvent extraction fluid and a process for the same which is capable of eliminating the drawbacks of the prior art.

Another object of the invention is to propose an annular centrifugal extractor with solid separation part to separate solid particles present in solvent extraction fluid and a process for the same which does not require any additional system for further processing of separated solid particle.

Yet another object of the invention is to propose an annular centrifugal extractor with solid separation part to separate solid particles present in solvent extraction fluid and a process for the same which does not require additional dechecking facility.

A still another object of the invention is to propose an annular centrifugal extractor with solid separation part to separate solid particles present in solvent extraction fluid and a process for the same which enhances ACE operating life.

A still further object of the invention is to propose an annular centrifugal extractor with solid separation part to separate solid particles present in solvent extraction fluid and a process for the same which ensures minimum maintenance cost.

A further object of the invention is to propose an annular centrifugal extractor with solid separation part to separate solid particles present in solvent extraction fluid and a process for the same which facilitates for sending separated solid particle for further processing or waste management facility.

In order to remove solid particles from the solution, a solid separation part is attached to the rotating bowl of ACE in such a way that solid particles settle inside the separation part.

Centrifugal extractor with solid separation part is designed and fabricated. Choking experiments were conducted in centrifugal extractor (CE) with and without solid separation part in bowls. Experimental results showed that CE with solid separation part can separate or hold solid particles without losing of flooding throughput. Amount of solid settled inside bowl with solid separation can be physically inspected due to threaded joint and necessary action may be taken before start-up. The removed solid particles having high radioactivity can be sent to waste management plant as a solid waste.

Annular centrifugal extractor is widely used in solvent extraction operations and offers some advantages and disadvantages. ACE is a candid candidate for the fast breeder reprocessing application. One of its main disadvantages is very sensitive to the solid particles which drastically affect the hydrodynamic operation by settling inside the rotating bowl due to high centrifugal acceleration. ACE is operational in CORAL facility for more than two decades to separate uranium and plutonium from fast breeder reactor spent nuclear fuel. The solid particles are frequently encountered during nuclear reprocessing. In order to handle solid particles, a new ACE coupled with solid centrifuge is developed. The new design can be operated in existing CORAL stationary bowl. It is the very first time that the solid separating centrifuge is coupled with centrifugal extractor as a single unit.

Novel solid separating centrifugal extractor contains two parts: (i) upper part act as a liquid-liquid separator to separate aqueous and organic solution used in solvent extraction operation and (ii) bottom part act as a solid separator to separate solid particle present in solvent extraction liquids. Diameter and height of the centrifugal extractor bowl with solid separation part is decided based on existing 30 mm diameter centrifugal extractor stationary bowl.

The hydrodynamic and mass transfer experiments have been carried out and the experimental data were compared with conventional centrifugal extractor bowl. It was evident from the experimental results that the performance of ACE with solid separation part is on par with the conventional ACE except at flooding throughput.

There is no apparent disadvantage of integrating solid-collection part to bottom of centrifugal extractor rotary bowl. Mass transfer efficiency (and recovery) is not affected by this change.

DESCRIPTION OF THE INVENTION

Figure 1:
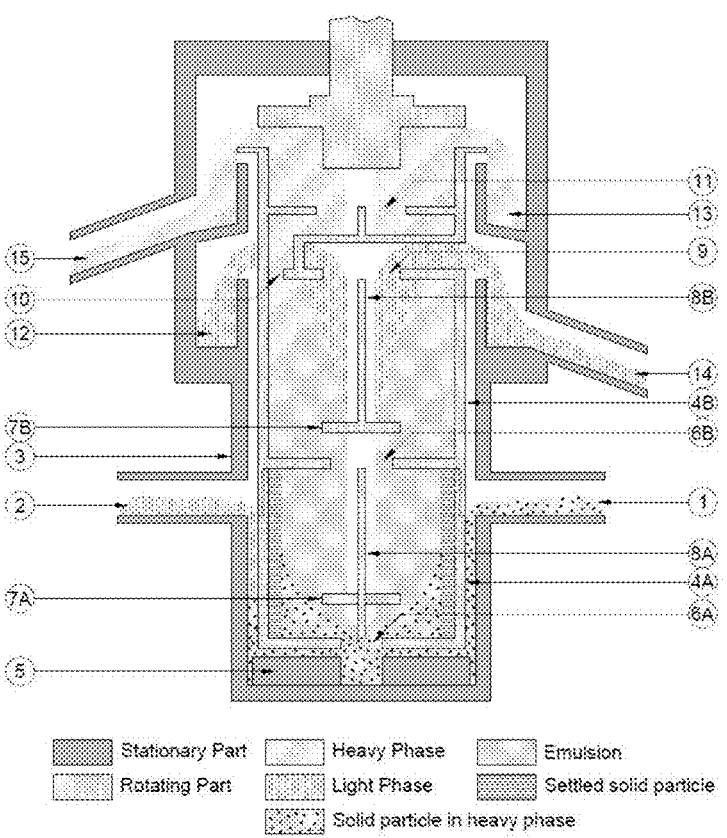
FIG. 1—shows schematic view of the annular centrifugal extractor with solid separation part according to the invention FIG. 2—shows schematic view of single stage ACE (without solid separation part) including drive and its support FIG. 3—shows schematic view of bowl with diameter and height according to invention FIG. 4—shows a schematic view of single stage setup during assembly FIG. 5—shows a schematic view of single stage setup assembled condition FIG. 6—shows a schematic view of seating block (16) placed above the stationary bowl (3) to support the drive FIG. 7—shows a schematic view of rotating bowl (4A & 4B)
Figure 2:
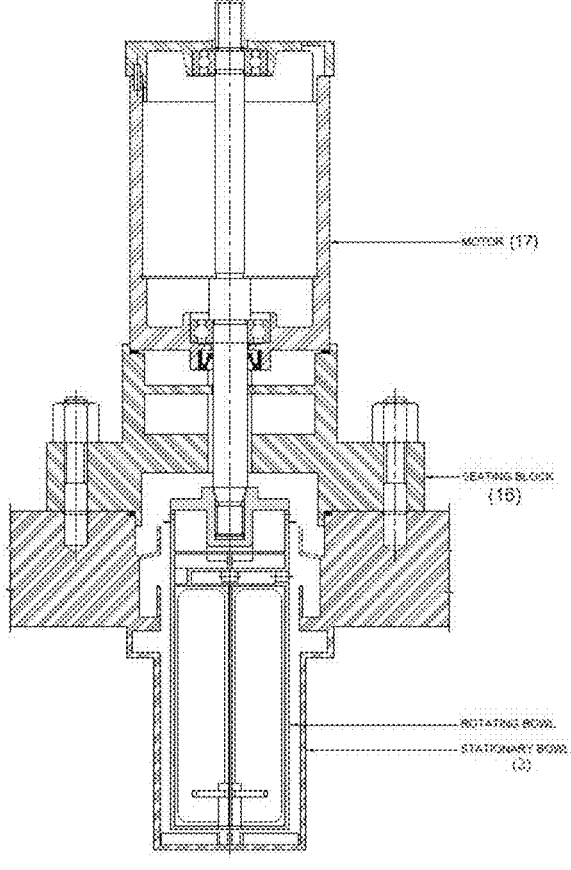
Figure 3:
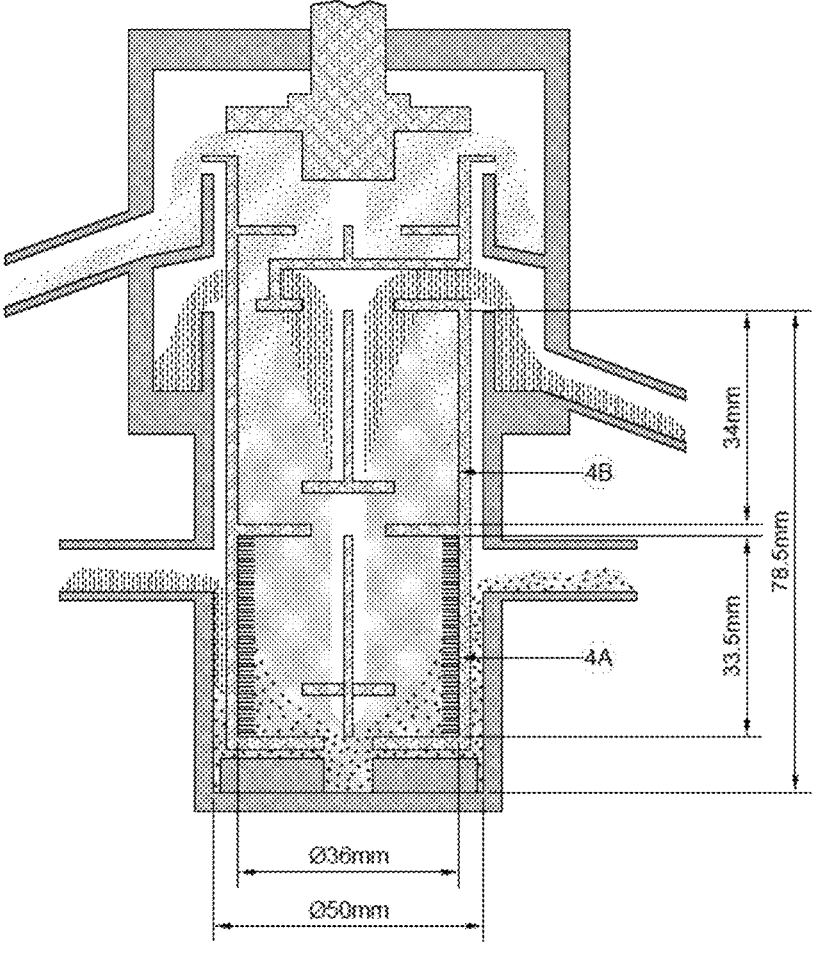
Figure 4:
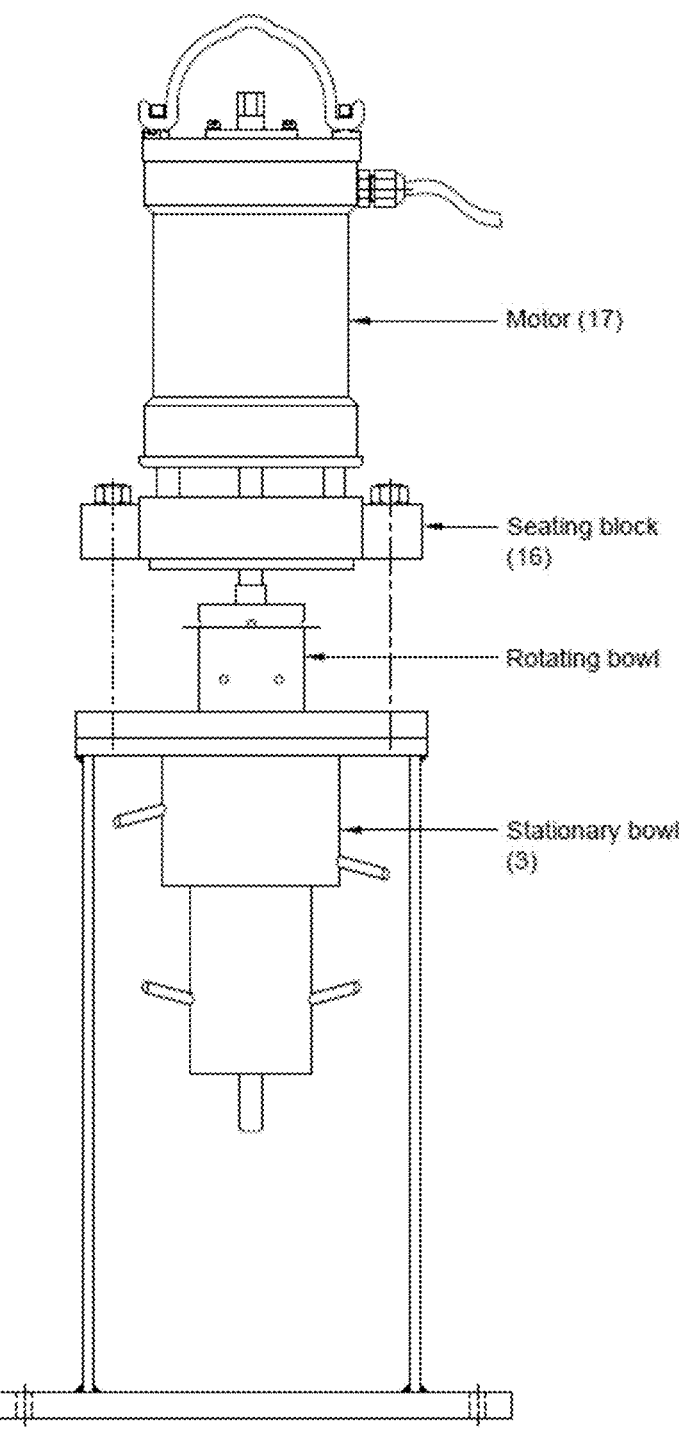
Figure 5:
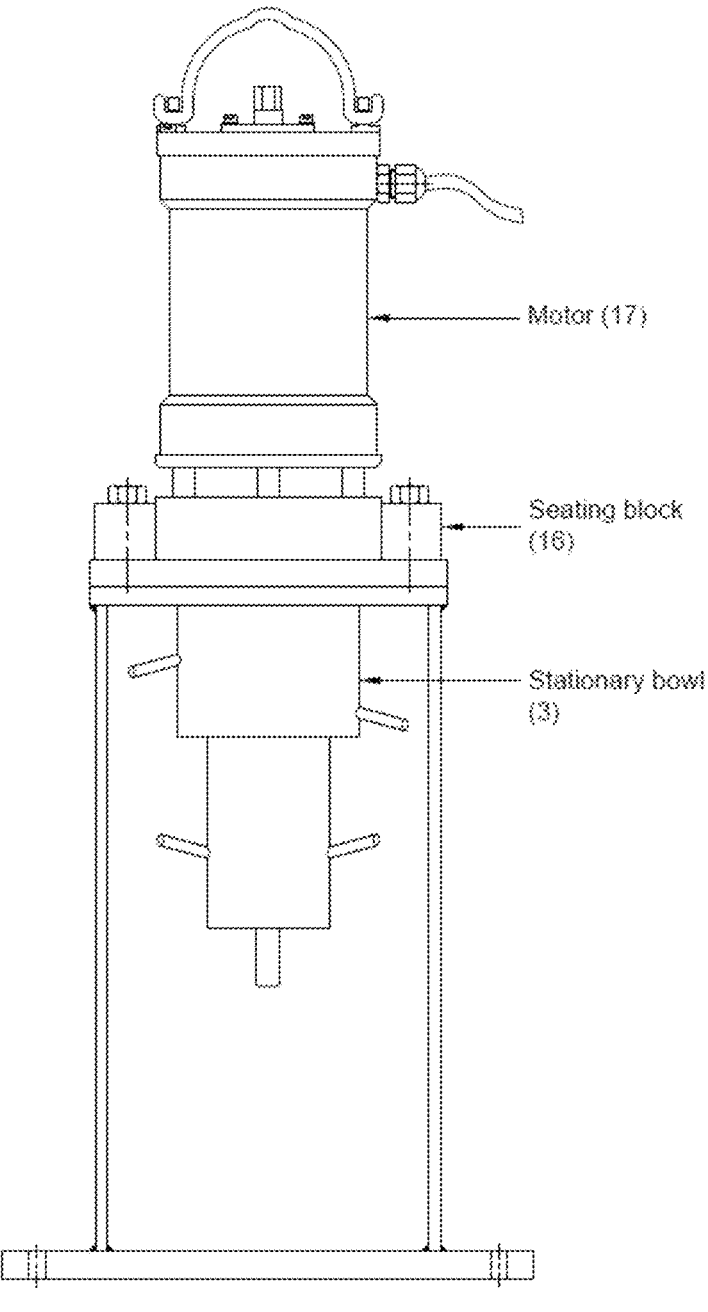
Figure 6:
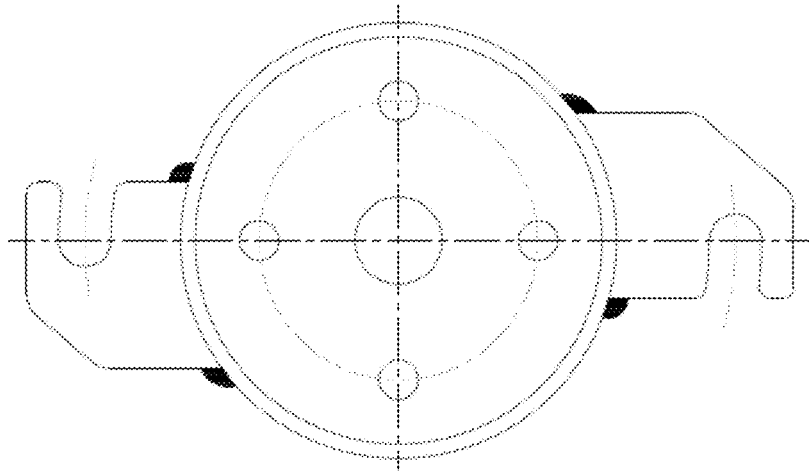
Figure 7:
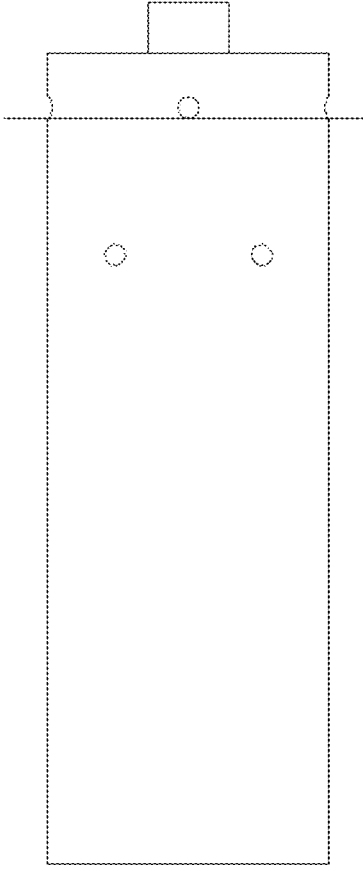
Figure 8:
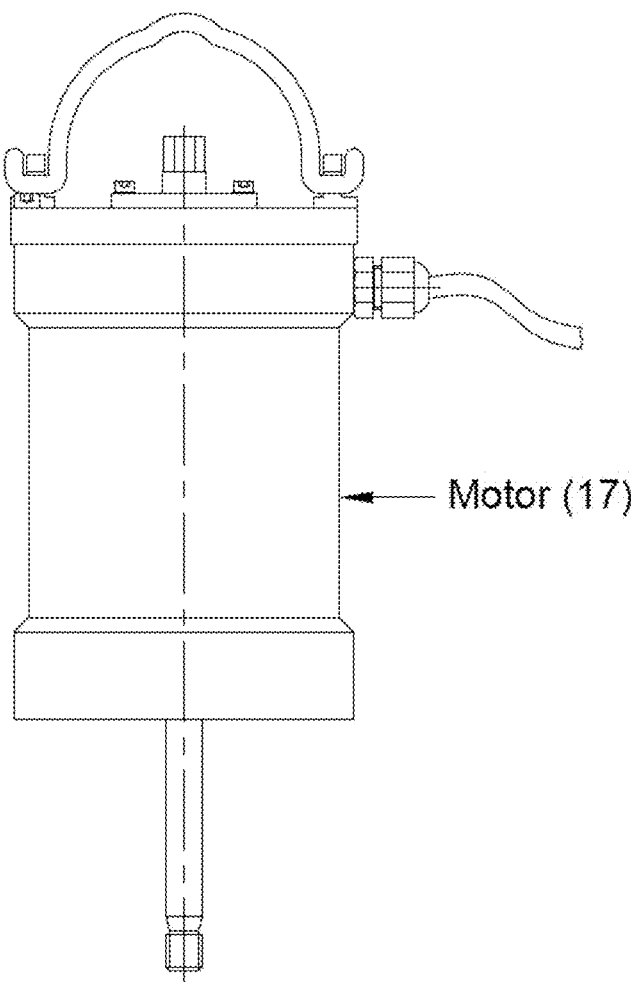
FIG. 8—shows a schematic view of motor/drive placed above the seating block (16) to rotate the ACE bowl (4A & 4B)
Figure 9:
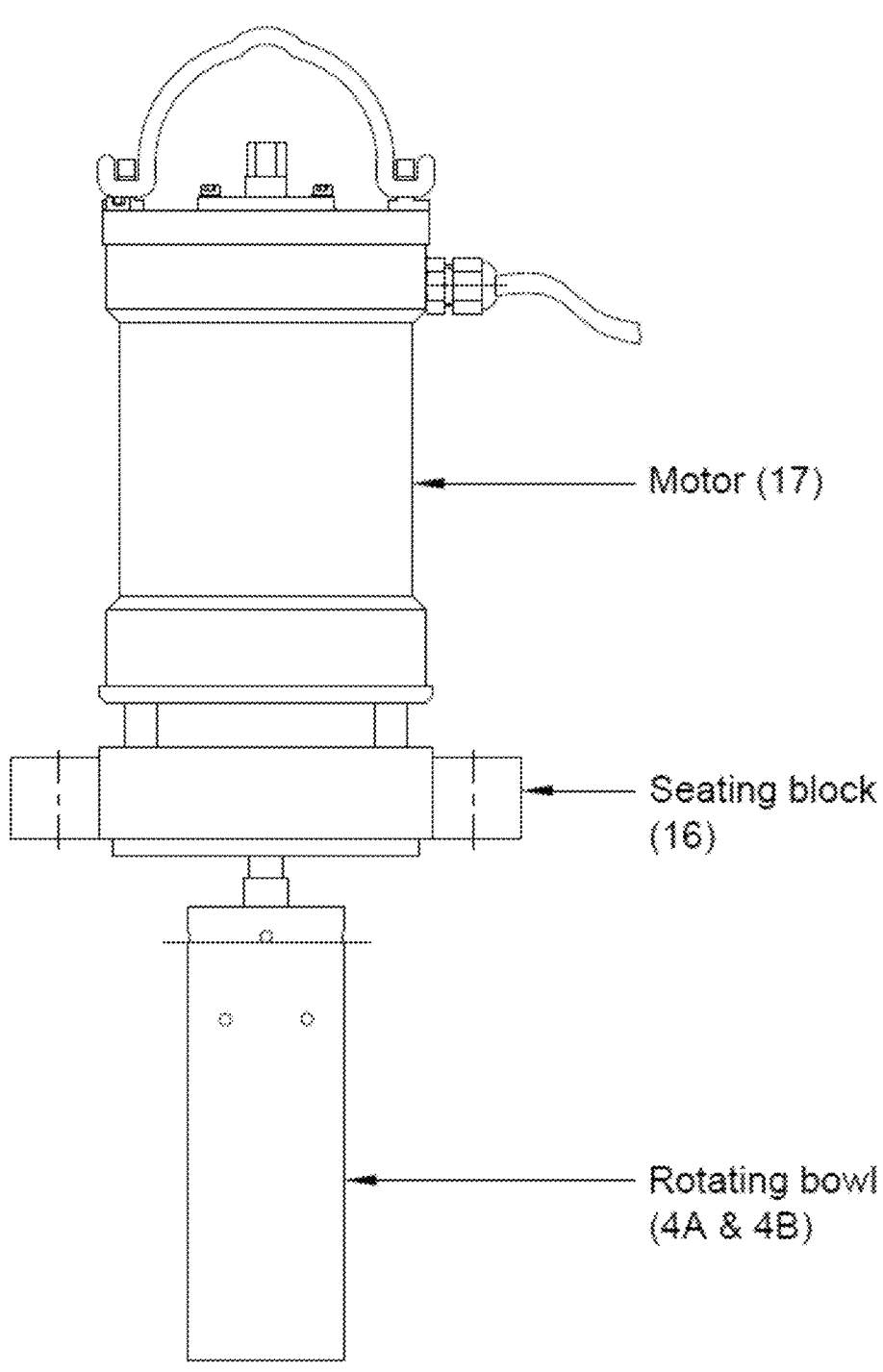
FIG. 9—shows a schematic view of complete assembly of motor (17), seating block (16) and rotating bowl (4A & 4B)
Figure 10:
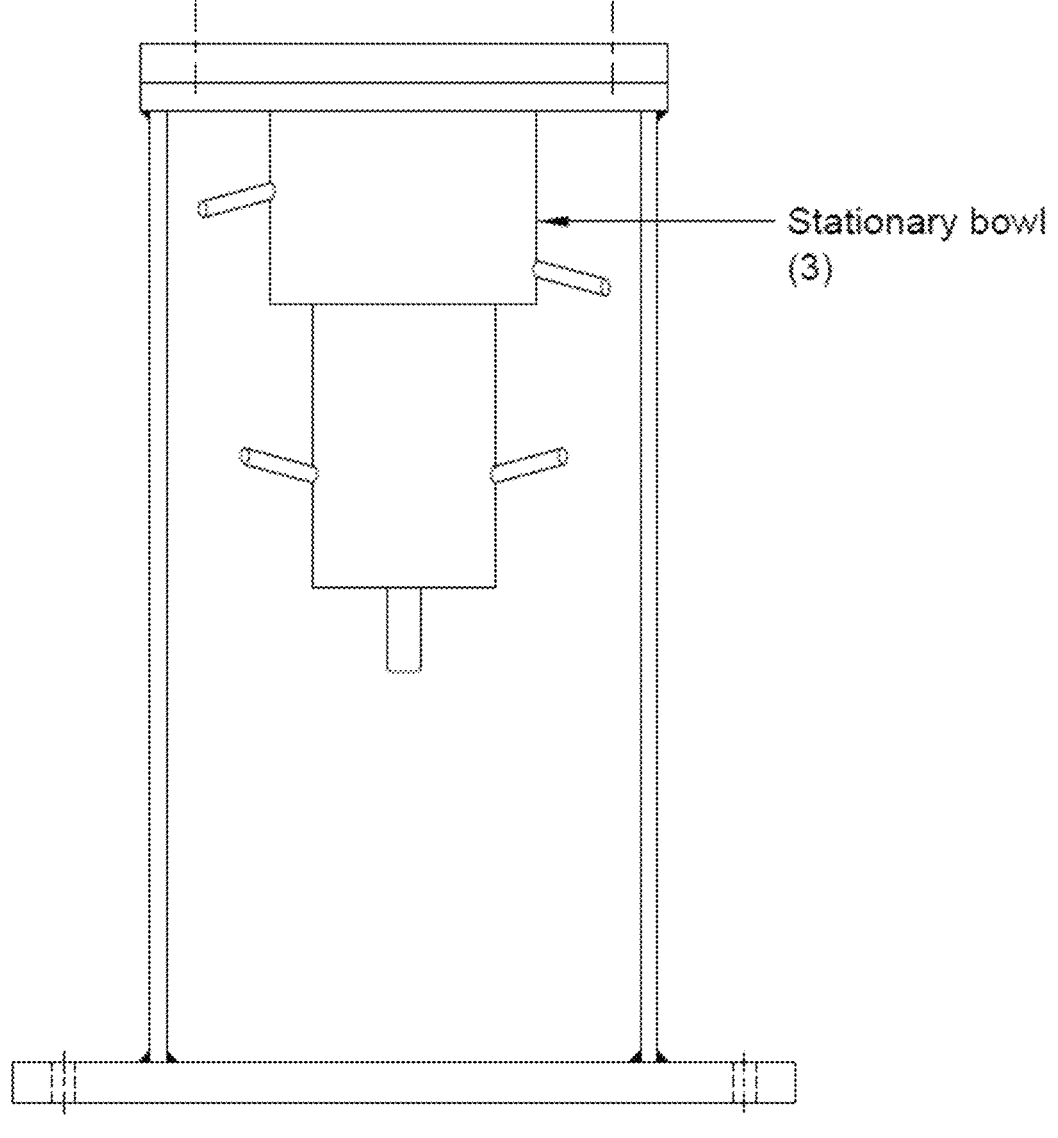
FIG. 10—shows a schematic view of single stage stationary bowl (3) with inlets, outlets and drain lines FIG. 11—shows a 3D schematic sectioned view of rotating bowl (4A & 4B) with vertical baffles (8A & 8B) and deflecting baffle (7A & 7B)
Figure 11:
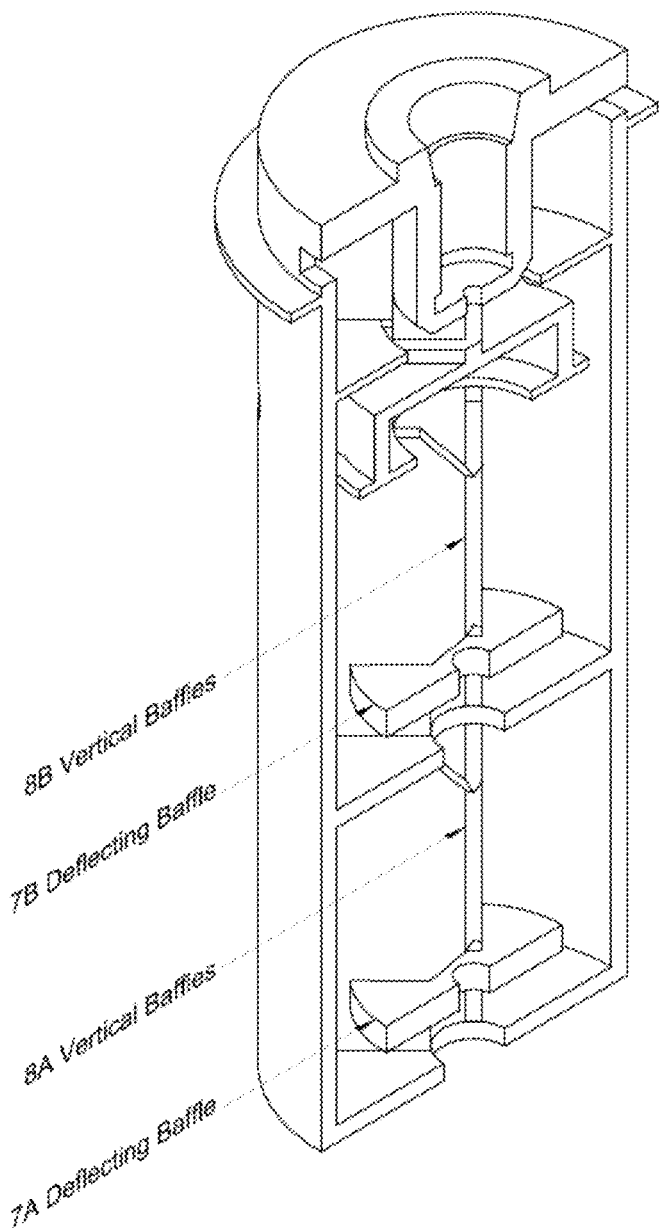
Figure 12:
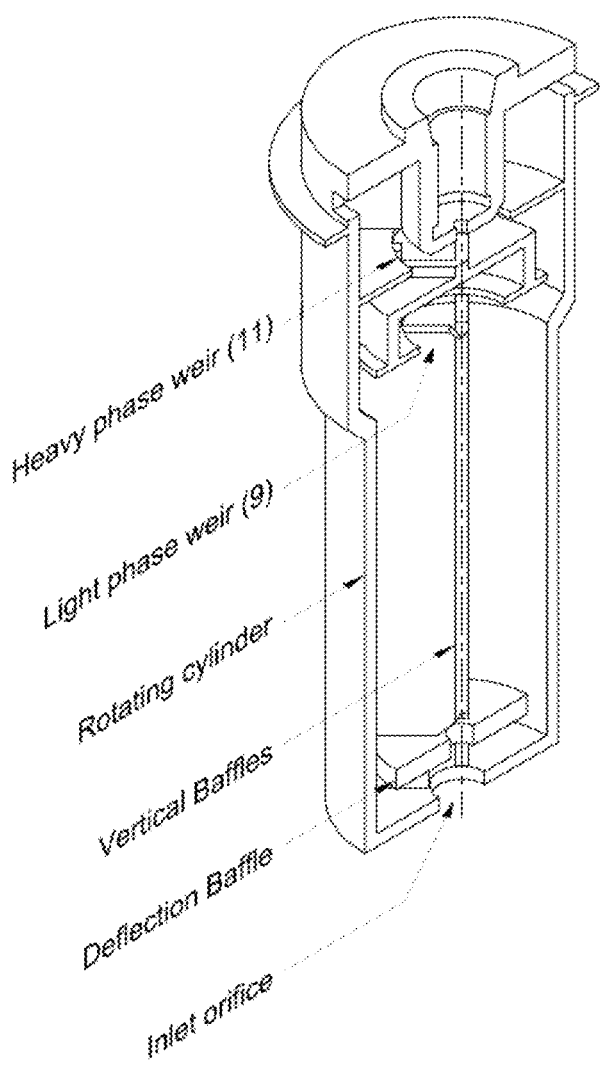
FIG. 12—shows a 3D schematic sectional view of rotating bowl without solid separation part FIG. 13—shows schematic view of vertical baffles FIG. 14—shows schematic view of deflecting baffle
Figure 13:
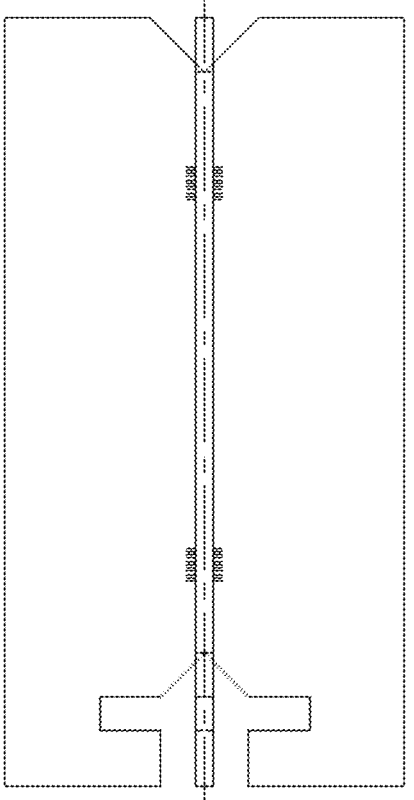
Figure 14:
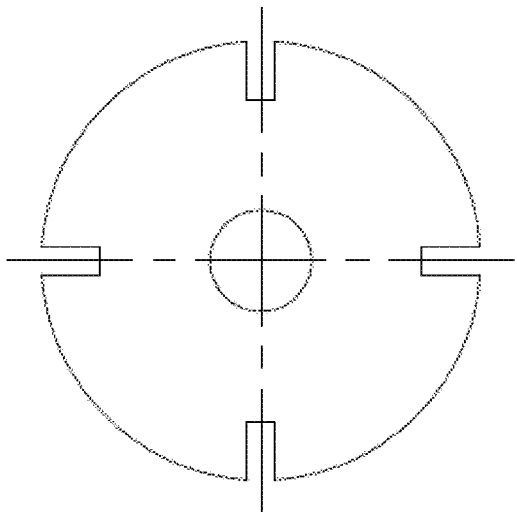

The annular centrifugal extractor (ACE) with solid separation part in accordance with the invention is shown in FIG. 1. The solid separating centrifuge is coupled with the existing annular centrifugal extractor bowl to handle the solid particle during solvent extraction operation. Bowl (4A & 4B) diameter and height are fixed based on process parameters such as (i) amount of liquid handled per unit time (L/h), (ii) particle size and (iii) amount of particle present in the process liquid (gm/litre) etc. Based on the diameter and height of the 4A & 4B bowl, the stationary bowl (3) diameter and height is fixed. Vertical baffles height (8A & 8B) is always equal to its corresponding bowl (4A & 4B) height. Its width is equal to half of the bowl diameter. As per plant requirements, the dimensions can be changed. According to present invention the 36 mm solid separating ACE bowl is developed to make it suitable for the existing plant condition when the bowls used are of the following dimensions:

1. 4A bowl: Diameter=36 mm & Height=34 mm
2. 4B bowl: Diameter=36 mm & Height=33.5 mm
3. Stationary bowl (3): Diameter=50 mm & Height=78.5 mm
4. Deflecting baffle (7A, 7B): Diameter=26 mm & Height/Thickness=3 mm
5. 8A Vertical baffles: Height=34 mm & width=18 mm
6. 8B Vertical baffles: Height=33.5 mm & width=18 mm Novel solid separating annular centrifugal extractor contains two rotating bowl parts (i) upper rotating part (4B) act as a liquid-liquid separator to separate aqueous and organic solution used in solvent extraction operation and (ii) bottom rotating part (4A) act as a solid separator to separate solid particle present in solvent extraction/process liquid. Bottom (4A) rotating cylinder/bowl (particle/solid separating rotor) is coupled with (4B) rotating cylinder/bowl (liquid/liquid separating rotor) by threaded joint (or any other joint).

The said ACE consists with solid separation part of a heavy phase inlet (1) for feeding heavy phase and light phase inlet (2) for feeding light phase of material into the ACE, a stationary cylinder/bowl (3), a rotating cylinder (4A) which is a particle/solid separating rotor, a rotating cylinder (4B) which is liquid/liquid separating rotor, radial baffles (5) on the stationary bottom plate, a central opening (6A) for rotating cylinder (4A), a central opening (6B) for rotating cylinder (4B), a deflecting baffle (7A) in the rotor (4A), a deflecting baffle (7B) in the rotor (4B), light phase weir (9), under flow region for heavy phase (10), heavy phase weir (11), light phase collection chamber (12), heavy phase collection chamber (13), light phase outlet part (14) and heavy phase outlet part (15). The stationary bowl (3) has a cover at the top, called as seating block (16) which supports the motor/drive to rotate the two threadedly joined bowls (4A, 4B).

During normal operation heavy phase with/without solid particles and light phase with/without solid particles enters through ACE via heavy phase feed pipe (1) and light phase feed pipe (2) in-between stationary bowl (3) and rotating bowl (4A & 4B). Both phases mixed vigorously in annular region by shear force/skin friction due to high-speed rotation of inner bowl and turbulent liquid-liquid dispersion promotes the mass transfer between two phases. Mixed phase (dispersion) with solid particles flows down by gravity in annular region and enters inside rotating bowl (particle/solid separating rotor, 4A (flat or conical shape bottom) through orifice (6A) via bottom baffle (5) (mixing vane, shape: straight or curved). Main function of bottom baffle is to break the vortex formation and provided in the bottom region which are either attached to the base of the outer cylinder or to the bottom of the rotating cylinder. Dispersion with solid particles entering inside the rotating bowl (particle/solid separating rotor, 4A) is deflected towards the wall of the rotating cylinder by deflecting baffle (7A) to enhance the centrifugal sedimentation of solid particles. Solid particles gets separated inside particle/solid separating rotor and dispersion flows from bottom to top inside the rotating bowl (and it is confined inside the chambers (four to eight numbers) by vertical baffles (8A). The rotating cylinder imparts a rigid body rotation to the dispersion with solid particles and creates vertically cylindrical free surface of liquid and it is coaxial with the axis of rotation because of high centrifugal acceleration 'a'. The central portion is occupied by air. The solid particles entering at the bottom gets separated as it moves upwards. The sedimentation rate of solid particles depends upon density difference between solid particle and mixed phase, viscosity of mixed phase, particle size distribution, and settling velocity of particle under centrifugal acceleration ($r\omega^2$). For complete separation of solid particles, adequate height and diameter are provided for a given level of centrifugal acceleration.

Dispersion (free from solid particles) entering inside the upper rotating bowl (4B, inside liquid/liquid separating rotor) through orifice (6B) is deflected towards the wall of the rotating cylinder by deflecting baffle (7B) to enhance the centrifugal separation of heavy and light phases. Dispersion phase gets separated and also flows from bottom to top inside the rotating bowl and it is confined inside the chambers (four to eight numbers) by vertical baffles (8B). The rotating cylinder imparts a rigid body rotation to the liquid and creates vertically cylindrical free surface of liquid and it is coaxial with the axis of rotation because of high centrifugal acceleration 'a'. The central portion is occupied by air. The dispersion entering at the bottom gets separated as it moves upwards. The separation rate of dispersed phase depends upon density difference between continuous and dispersed phase, viscosity of continuous phase, drop size distribution, settling velocity of dispersed phase under centrifugal acceleration ($r\omega^2$) and coalescing behavior of the dispersed phase. For complete separation (which is considered to be a flagship advantage of ACEs) of dispersion, adequate height and diameter are provided for a given level of centrifugal acceleration. Separated lighter phase flow over light phase weir (9) and it is thrown out in to lighter phase collection chamber (12) located at stationary bowl. Similarly, heavy phase flows over heave phase weir (11) via under flow (10) and it is thrown out in to heavy phase collection chamber (13) located above lighter phase collection chamber at stationary bowl. Finally both heavy phase and light phase comes out or flows in to adjacent stages through light phase outlet (14) and heavy phase outlet (15).

After N number of solvent extraction cycles (value of N, depends upon the concentration of solid particles in process liquid) the bottom (4A) rotating cylinder (particle/solid separating rotor) is decoupled from (4B) rotating cylinder (liquid/liquid separating rotor) and the solid is sent for further processing or solid waste management facility.

Advantages a. The proposed design of rotor separates solid particles present in solvent extraction process liquid.
b. Possibility of remote maintenance.
c. Doesn't require any additional system for further processing of separated solid particle.
d. Enhances the ACE operating life.
e. The removable solid separation part can be sent directly to waste management facility for further processing of radioactive solid particles.
f. Doesn't require additional dechoking facility.

The invention claimed is:

1. An annular centrifugal extractor (ACE) with solid separation part to separate solid particles present in solvent extraction fluid, the ACE comprising:
   a stationary cylinder/bowl (3) comprising:
      a heavy phase inlet (1) for feeding heavy phase of material with/without solid particles into the ACE;
      a light phase inlet (2) for feeding light phase of material with/without solid particles into the ACE;
      a light phase outlet port (14) for allowing light phase material to come out for subsequent stages;
      a heavy phase outlet port (15) for allowing heavy phase material to exit for subsequent stages;
      a lighter phase collector (12) to receive thrown out separated lighter phase flowing over light phase weir (9); and
      a heavy phase collector (13) located above the lighter phase collector (12) in the stationary cylinder/bowl (3) to receive thrown out heavy phase material flowing over a heavy phase weir (11) via under flow (10);
   a rotating cylinder/bowl (4B) working as a liquid/liquid separating rotor;
   a rotating cylinder/bowl (4A) working as a solid separating rotor, wherein the rotating cylinder/bowl (4A) working as the solid separating rotor is disposed inside the stationary cylinder/bowl (3) as particle/solid separating rotor, and the rotating cylinder/bowl (4A) working as the solid separating rotor is coupled with the rotating cylinder/bowl (4B) working as the liquid/liquid separating rotor by threaded joint to act as a solid separator to separate solid particles present in solvent extraction/process liquid, and wherein a deflecting baffle (7A) is disposed inside the solid separating rotor (4A) to deflect a dispersion with solid particles entering inside the rotating cylinder/bowl (4A) working as the solid separating rotor towards an inner wall of the rotating cylinder/bowl (4A) working as the solid separating rotor;

a plurality of vertical baffles (8A) in the solid separating rotor (4A) to confine the separated solid particles inside chambers of the solid separating rotor;

a central opening (6B) for rotating the cylinder/bowl (4B) working as the liquid/liquid separating rotor for allowing a dispersion being free from solid particles to enter inside the rotating cylinder/bowl (4B) working as the liquid/liquid separating rotor;

a deflecting baffle (7B) in the liquid/liquid separating rotor to deflect the dispersion being free from solid particles towards a wall of the rotating cylinder/bowl (4B); and a plurality of vertical baffles (8B) in the liquid/liquid separating rotor to confine a separated dispersed phase inside chambers of the liquid/liquid separating rotor (4B).

2. The annular centrifugal extractor (ACE) with solid separation part, as claimed in claim 1, wherein an orifice (6A) is disposed as a central opening for the rotating cylinder/bowl (4A) working as the solid separating rotor to allow mixed phase dispersion with solid particles to flow down by gravity in an annular region to enter inside the rotating cylinder/bowl (4A) working as the solid separating rotor via a bottom baffle (5).

3. The annular centrifugal extractor (ACE) with solid separation part, as claimed in claim 1, wherein the vertical baffles (8A) are disposed in the rotating cylinder/bowl (4A) working as the solid separating rotor to cause the dispersion with solid particles to flow from bottom to top and the solid particles settle inside the rotating cylinder/bowl working as the solid separating rotor and confined inside the chambers of the solid separating rotor (4A).

4. A method to separate solid particles present in solvent extraction fluid, the method comprising the following steps:

i). allowing a heavy phase of material with or without solid particles and a light phase of material with or without solid particles to enter through an annular centrifugal extractor (ACE) via a heavy phase feed pipe (1) and a light phase feed pipe (2) in between a stationary bowl (3) and rotating bowls (4A, 4B);

ii). mixing of both the heavy phase and the light phase vigorously in an annular region by shear force/skin friction due to high-speed rotation of a first of the rotating bowls (4A) when turbulent liquid-liquid dispersion promotes mass transfer between the two phases, wherein the mixing of both the heavy phase and the light phase produces a mixed phase dispersion with solid particles;

iii). flowing down of the mixed phase dispersion with solid particles by gravity in the annular region and to enter inside the first of the rotating bowls (4A) through an orifice (6A) via a bottom baffle (5);

iv). allowing the mixed phase dispersion with solid particles entering inside the first of the rotating bowls (4A) to deflect towards a wall of the first of the rotating bowls (4A) by a deflecting baffle (7A) enhancing centrifugal sedimentation of solid particles;

V) allowing the mixed phase dispersion with solid particles to flow from bottom to top inside the first of the rotating bowls (4A) to confine inside chambers of the first of the rotating bowls (4A) by vertical baffles (8A);

vi). allowing the first of the rotating bowls (4A) to impart a rigid body rotation to the mixed phase dispersion with solid particles to create vertically cylindrical free surface of liquid/mixed phase dispersion to become co-axial with an axis of rotation because of high centrifugal acceleration 'a';

vii). allowing the solid particles to enter at the bottom and to get separated as it moves upwards, thereby producing a dispersion being free from solid particles;

viii). allowing the dispersion being free from solid particles to enter inside a second of the rotating bowls (4B) through an orifice (6B);

ix). enhancing centrifugal separation of heavy and light phases by deflecting the dispersion being free from solid particles towards a wall of the second of the rotating bowls (4B) by a deflecting baffle (7B);

x). allowing a mixed phase dispersion to flow from bottom to top inside the second of the rotating bowls (4B) and to be confined inside chambers of the second of the rotating bowls (4B) by vertical baffles (8B);

xi). allowing the second of the rotating bowls (4B) to impart a rigid body rotation to the liquid/mixed phase dispersion creating vertically cylindrical free surface of the liquid/mixed phase dispersion to become co-axial with the axis of rotation because of the high centrifugal acceleration 'a';

allowing the dispersion being free from solid particles to enter at the bottom and to get separated as it moves upwards, thereby producing a separated lighter phase and a separated heavy phase;

xiii). allowing the separated lighter phase to flow over a light phase weir (9) for being thrown out into a lighter phase collector (12) located at the stationary bowl (3);

xiv). allowing the separated heavy phase to flow over a heavy phase weir (11) via under flow (10) for being thrown out into heavy phase collector (13) located above the lighter phase collector (12) in the stationary bowl (3);

xv). allowing both the separated heavy phase and the separated light phase to come out and flow in to adjacent stages through a heavy phase outlet (15) and a light phase outlet (14), respectively; and xvi). decoupling the first of the rotating bowls (4A) from the second of the rotating bowls (4B) and arranging the solid particle to be collected and dispersed for further processing or solid waste management facility.

5. The method as claimed in claim 4, wherein the bottom baffle (5) breaks the vortex formation of the mixed phase dispersion.

* * * * *